United States Patent Office 3,235,566
Patented Feb. 15, 1966

3,235,566
BENZOFURAN-3-CARBOXYLIC ACIDS
AND ESTERS
Wolfgang Schoetensack, Konstanz (Bodensee), Guenther Hallmann, Limburgerhof, Pfalz, and Karl Haegele, Hilzingen, Kreis Konstanz, Germany, assignors to Byk-Gulden Lomberg Chemische Fabrik G.m.b.H., Konstanz (Bodensee), Germany, a corporation of Germany
No Drawing. Filed Apr. 1, 1963, Ser. No. 269,768
Claims priority, application Germany, Apr. 13, 1962,
B 66,817
10 Claims. (Cl. 260—346.2)

The present invention relates to new benzofuran-3-carboxylic acids and more particularly to benzofuran-3-carboxylic acids which are substituted in 2- and 5-position, and to a process of making and using same.

It is one object of the present invention to provide new and valuable benzofuran-3-carboxylic acids which are substituted in 2- and 5-position and which have valuable pharmacological properties.

Another object of the present invention is to provide a simple and effective process of producing such new and valuable 2- and 5-substituted benzofuran-3-carboxylic acids.

Still another object of the present invention is to provide valuable pharmaceutical compositions containing, as active ingredients such benzofuran-3-carboxylic acids which are substituted in 2- and 5-position and which are useful muscle relaxants and central nervous system suppressing agents.

A further object of the present invention is to provide a method of treating humans and animals with such muscle relaxants and central nervous system suppressing agents.

Other objects of the present invention and advantageous features thereof will become apparent as the description proceeds.

In principle the new and valuable substituted benzofuran-3-carboxylic acids according to the present invention are characterized by the following formula I

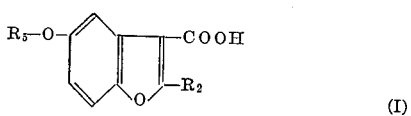

In said formula $R_2$ indicates a straight-chain, branched, or cyclic alkyl or alkenyl radical with 1 to 5 carbon atoms, the phenyl radical, or a substituted phenyl radical, while
$R_5$ indicates hydrogen, a straight-chain, or branched alkyl or alkenyl radical with 1 to 5 carbon atoms, the phenyl radical, a substituted phenyl radical, the phenacyl group, the benzyl radical, or a substituted benzyl radical.

Compounds according to said Formula I are obtained by condensing p-quinone with a β-keto carboxylic acid alkyl ester, preferably with a β-keto carboxylic acid ethyl ester in the presence of an acid condensing agent. Anhydrous zinc chloride has proved to be the preferred condensing agent. The reaction is preferably carried out in an anhydrous lower alcohol such as anhydrous ethanol, at its boiling temperature. Likewise propanol, isopropanol, or isobutanol can be used, whereby the reaction is carried out at a temperature of 80–85° C.

The β-keto carboxylic acid alkyl esters, for instance, the ethyl ester used according to the present invention correspond to Formula II $$R_2\text{—CO—CH}_2\text{—COOC}_2H_5 \quad \text{(II)}$$

wherein $R_2$ represents the same substituents as indicated hereinabove.

When proceeding according to said process, a benzofuran-3-carboxylic acid alkyl ester, substituted by a hydroxyl group in 5-position, is obtained, which in addition thereto carries in 2-position the substituent $R_2$ depending upon the β-keto carboxylic acid alkyl ester used as starting material as shown in Table 1. Thereafter, the resulting compounds are reacted with an alkyl halogenide of Formula III

wherein $R_5$ represents the same substituents as indicated hereinabove.

This reaction is preferably carried out under alkaline conditions in a suitable polar solvent such as acetone or dimethyl formamide. When proceeding in this manner, the hydroxyl group in 5-position of the starting benzofuran-3-carboxylic acid alkyl ester is etherified without difficulty and with a good yield. Preferably the alkyl bromides are used as alkyl halogenides because they are of satisfactory reactivity and readily available. Table 2 illustrates a number of possibilities of varying the substituent $R_5$ in 5-position by using various alkyl halogenides and also the resulting benzofuran-3-carboxylic acid alkyl esters, etherified in 5-position and substituted in 2-position by substituent $R_2$.

The resulting benzofuran-3-carboxylic acid alkyl esters are finally saponified in a conventional manner, for instance, by means of alcoholic alkali metal hydroxide solution. The temperature during saponification may be between about 20° C. and the boiling point of the saponification mixture depending upon the nature and sensitivity of the various substituents. Sometimes it will be of advantage to carry out the saponification in the presence of an inert protective gas. The benzofuran-3-carboxylic acids according to the present invention are finally obtained in a good yield by acidifying the clear saponification mixture, for instance, by the addition of hydrochloric acid. A number of acids as they are obtained according to the present invention are given in Table 3.

The process according to this invention may be illustrated by the following equation:

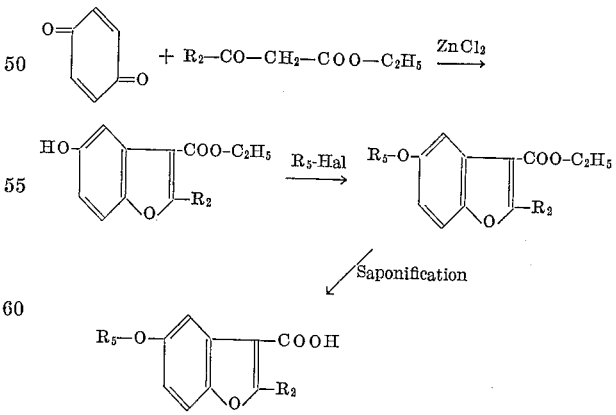

The new compounds obtained according to the present invention possess valuable pharmacological properties. They are, for instance, excellent muscle relaxants and have a suppressing or inhibiting effect on the actions of the central nervous system.

The following examples serve to illustrate the present invention without, however, limiting the same thereto.

EXAMPLE 1

*2-n-propyl-5-hydroxy benzofuran-3-carboxylic acid ethyl ester*

100 g. (0.575 mole) of n-butyroyl acetic acid ethyl ester and 39.2 g. (0.228 mole) of anhydrous zinc chloride are dissolved in 51.5 cc. of absolute ethanol. The solution is heated to 80–85° C. while stirring. 31 g. (0.288 mole) of p-quinone are added thereto within 6 hours in portions each of 0.3 g. of said compound about every three minutes. After standing at a temperature of about 20° C. for 12 hours, the precipitate is filtered off by suction from the black-brown colored solution and is subjected to fractional recrystallization from acetic acid ethyl ester. About 25 g. of the above mentioned ethyl ester are obtained, corresponding to 35% of the theoretical yield. Melting point: 105–106° C.

By proceeding as described hereinabove analogous 2-substituted 5-hydroxy benzofuran-3-carboxylic acid ethyl esters are obtained by using the respective 2-substituted β-keto carboxylic acid ethyl esters as starting material. The resulting compounds are listed in the following Table 1.

TABLE 1

| Substituent $R_2$ in 2-position | Melting point (° C.) | Yield |
| --- | --- | --- |
| Ethyl | 123–124 | 30 |
| n-Propyl | 105–106 | 35 |
| Cyclopropyl | 161–163 | 51 |
| Isobutyl | 142–144 | 47 |
| p-Bromo phenyl | 166–167 | 14 |
| p-Methoxy phenyl | 172–173 | 20 |
| p-Ethoxy phenyl | 178–179 | 41 |

EXAMPLE 2

*2-methyl-5-benzyloxy benzofuran-3-carboxylic acid ethyl ester*

160 g. (0.727 mole) of 2-methyl-5-hydroxy benzofuran-3-carboxylic acid ethyl ester are added to a suspension of 276 g. (2 moles) of potassium carbonate in 1.2 l. of acetone. 150 g. (0.85 mole) of benzylbromide are added thereto. The mixture is heated to boiling under reflux and with the exclusion of moisture for 8 hours. The precipitate is filtered off by suction while still hot. The filtrate is concentrated by evaporation and the remaining residue triturated with ethanol, whereby the benzyl ether crystallizes. It is recrystallized from ethanol yielding colorless crystals. Melting point: 46–47° C. The yield: 188.5 g., corresponding to 83.5% of the theoretical yield. Analogous benzofuran-3-carboxylic acid ethyl esters, etherified in 5-position, which carry in 2-position various substituents $R_2$ can be prepared by proceeding in the same manner as described above by reacting the corresponding 2-substituted 5-hydroxy benzofuran-3-carboxylic acid ethyl esters with alkyl halogenides as indicated in the following Table 2.

TABLE 2

| Substituent $R_2$ in 2-position | Substituent $R_5$ in 5-position | Yield (percent) | Melting point (° C.) |
| --- | --- | --- | --- |
| Methyl | 2,3-propenyl | 90 | (¹) |
| Do | n-Butyl | 78 | (²) |
| Do | Benzyl | 84 | 46–47 |
| Do | p-Bromo benzyl | 76 | 60–61 |
| Do | m-Bromo benzyl | 59 | 58–59 |
| Do | m-Nitro benzyl | 50 | 121–122 |
| Do | Benzoyl methyl | 77 | 121–122 |
| Ethyl | Benzyl | 90 | 39–40 |
| n-Propyl | do | 85 | 51–53 |
| Cyclopropyl | do | 84 | 77–79 |
| Isobutyl | do | 78 | 44–46 |
| Phenyl | do | 85 | 63–64 |
| p-Bromo phenyl | do | 94 | 90–91 |
| p-Methoxy phenyl | do | 95 | 92–93 |
| p-Ethoxy phenyl | do | 98 | 89–90 |

¹ B.P., 110–111/0.04 mm. Hg.
² B.P., 150/0.09 mm. Hg.

EXAMPLE 3

*2-methyl-5-benzyloxy benzofuran-3-carboxylic acid*

60 g. (0.193 mole) of the ester prepared according to Example 2 are dissolved in a solution of 25 g. (0.45 mole) of potassium hydroxide in 200 cc. of ethanol, and 50 cc. of water. The solution is heated to boiling under reflux for one hour, whereafter the alcohol is removed by vacuum distillation. The reaction mixtre is diluted with water and the clear solution is acidified. The resulting precipitate is filtered off by suction, washed with dilute hydrochloric acid, and recrystallized from acetone. Colorless crystals of the melting point 217–218° C. are obtained. The yield is 45.5 g., corresponding to 84% of the theoretical yield.

The following 2- and 5-substituted benzofuran-3-carboxylic acids are prepared in an analogous manner by saponifying the corresponding 2- and 5-substituted benzofuran-3-carboxylic acid ethyl esters, in which the substituents $R_2$ and $R_5$ represent the members indicated in Table 3.

TABLE 3

| Substituent $R_2$ in 2-position | Substituent $R_5$ in 5-position | Yield (percent) | Melting point, ° C. | Remarks |
| --- | --- | --- | --- | --- |
| Methyl | 2,3-propenyl | 69 | 161–163 | |
| Do | n-Butyl | 75 | 147–149 | |
| Do | Benzyl | 84 | 217–219 | |
| Do | p-Bromo benzyl | 83 | 203–205 | At 20° C. for 12 hrs. |
| Do | m-Bromo benzyl | 94 | 202–205 | Do. |
| Do | m-Nitro benzyl | 60 | 205–206 | |
| Do | Benzoyl methyl | 55 | ¹ 179 | At 20° C. under nitrogen for 3 weeks. |
| Ethyl | Benzyl | 89 | 178–179 | |
| n-Propyl | do | 92 | 170–172 | |
| Cyclopropyl | do | 85 | 196–197 | |
| Isobutyl | do | 90 | 189–191 | |
| Phenyl | do | 83 | 196–198 | |
| p-Bromo phenyl | do | 89 | 254–256 | |
| p-Methoxy phenyl | do | 86 | 217–218 | |
| p-Ethoxy phenyl | do | 86 | 214–216 | |

¹ Decomposition.

The new compounds are preferably administered orally in the form of tablets, pills, powders, capsules, solutions, emulsions, suspensions, dispersions, and in any other suitable form. They are preferably not used as such, but are diluted with suitable diluting agents, thus, allowing better and more economical use to be made thereof.

In the case of powders, fine, uniform dispersion of the new compounds within the diluting agent is of importance. Such a fine dispersion can be achieved, for instance, by mixing and milling the new compounds with a solid, pulverulent extending agent to the desired fineness, or by impregnating the already milled, finely powdered, solid carrier with a solution of the active compound in a suitable solvent and then removing the solvent.

As solid carriers, which are suitable for the manufacture of useful pharmaceutical preparations, various inert pulverulent distributing agents as they are conventionally used in pharmaceutical compounding may be employed.

When preparing tablets, pills, powders, and the like, the commonly used diluting agents, binders, lubricants, and the like are added, such as sugar, lactose, talcum, starch, pectins; as binders gelatin, gum arabic, methyl cellulose, yeast extract, agar, tragacanth; and as lubricating agents, magnesium stearate, stearic acid, and others.

The new compounds may, of course, also be administered parenterally, for instance, by intravenous or intramuscular injection. For this purpose aqueous or saline solutions, especially of their water soluble alkali metal salts or salts with suitable nontoxic organic amines or suspensions therein may be used.

Rectal application in the form of conventional suppositories is also possible.

Of course, many changes and variations in the starting materials, in the reaction conditions, temperature, duration, solvents used, in the methods of working up the reaction mixture and of purifying the benzofuran compounds and their alkali metal salts, and the like may be made by those skilled in the art in accordance with the principles set forth herein and in the claims annexed hereto.

We claim:
1. 2-methyl-5-benzyloxy benzofuran-3-carboxylic acid.
2. 2-methyl-5-benzyloxy benzofuran-3-carboxylic acid ethyl ester.
3. 2-lower alkyl-5-benzyloxy benzofuran-3-carboxylic acid.
4. 2-lower alkyl-5-benzyloxy benzofuran-3-carboxylic acid ethyl ester.
5. 2-cyclopropyl-5-benzyloxy benzofuran-3-carboxylic acid.
6. The 5-benzyloxy benzofuran-3-carboxylic acid having in 2-position a substituent selected from the group consisting of phenyl, lower alkoxy-substituted phenyl, and halogen-substituted phenyl.
7. 2-ethyl-5-benzyloxy benzofuran-3-carboxylic acid.
8. 2-n-propyl-5-benzyloxy benzofuran - 3 - carboxylic acid.
9. 2-isobutyl-5-benzyloxy benzofuran-3-carboxylic acid.
10. 2-methyl-5-allyloxy benzofuran-3-carboxylic acid.

References Cited by the Examiner
UNITED STATES PATENTS 2,744,852   5/1956   Goodman _____ 167—65
2,780,577   2/1957   Phillips et al. _____ 167—65

OTHER REFERENCES

Bertanek, Acta Chem. Scand., vol. 7 (1953), pages 677–81.

Grinev et al., Chemical Abstracts, vol. 53 (1959), col. 1296 (abstract of Zhur. Obshcei Khim. 28 (1958), 1850–3).

Grinev et al., Chemical Abstracts vol. 51 (1957), col. 16,408 (abstract of Zhur. Obshcei Khim. 27 (1957), 821–3).

NICHOLAS S. RIZZO, *Primary Examiner.*